United States Patent
Dudar

(10) Patent No.: US 11,674,460 B1
(45) Date of Patent: Jun. 13, 2023

(54) FUEL CANISTER HEATING AND PURGING SYSTEM

(71) Applicant: FORD GLOBAL TECHNOLOGIES, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/953,657

(22) Filed: Sep. 27, 2022

(51) Int. Cl.
- *F02D 41/00* (2006.01)
- *F02M 25/08* (2006.01)
- *B01D 53/04* (2006.01)

(52) U.S. Cl.
CPC ....... *F02D 41/003* (2013.01); *B01D 53/0415* (2013.01); *B01D 53/0438* (2013.01); *B01D 53/0446* (2013.01); *F02M 25/0836* (2013.01); *F02M 25/0854* (2013.01); *B01D 2253/102* (2013.01); *B01D 2257/702* (2013.01); *B01D 2259/402* (2013.01); *B01D 2259/4009* (2013.01); *B01D 2259/4516* (2013.01); *B01D 2259/4566* (2013.01); *F02M 2025/0881* (2013.01)

(58) Field of Classification Search
CPC .......... F02D 41/003; F02M 2025/0881; F02M 25/0836; F02M 25/0854; B01D 53/0415; B01D 53/0438; B01D 53/0446; B01D 2253/102; B01D 2257/702; B01D 2259/4009; B01D 2259/402; B01D 2259/4516; B01D 2259/4566
See application file for complete search history.

(56) References Cited

U.S. PATENT DOCUMENTS

| | | | |
|---|---|---|---|
| 5,687,697 A * | 11/1997 | Ishikawa | F02M 25/089 123/557 |
| 9,518,539 B2 | 12/2016 | Kragh et al. | |
| 2013/0133629 A1 * | 5/2013 | Ogita | F02M 25/08 123/519 |
| 2015/0090233 A1 * | 4/2015 | Dudar | F02M 25/0809 123/520 |
| 2015/0120110 A1 * | 4/2015 | Yang | F02D 41/0032 903/903 |
| 2018/0058384 A1 * | 3/2018 | Dudar | F02D 41/221 |
| 2019/0101072 A1 | 4/2019 | Dudar | |
| 2019/0145331 A1 | 5/2019 | Dudar | |

* cited by examiner

*Primary Examiner* — Sizo B Vilakazi
*Assistant Examiner* — Sherman D Manley
(74) *Attorney, Agent, or Firm* — Vincent Mastrogiacomo; Brooks Kushman P.C.

(57) ABSTRACT

A vehicle includes a fuel tank, a primary canister, a secondary canister, a first valve, a second valve, a third valve, a heater, and a controller. The primary and secondary canisters are in fluid communication with the fuel tank and are configured to receive and store evaporated fuel from the fuel tank. The first valve is disposed between the fuel tank and the primary canister. The second valve is disposed between the secondary canister and ambient surroundings. The third valve is disposed between the primary canister and an engine. The heater is configured to heat the primary and secondary canisters. The controller is programmed to (i) activate the heater to heat the primary and secondary canisters and (ii) purge the evaporated fuel from the primary and secondary canisters after heating the primary and secondary canisters.

20 Claims, 3 Drawing Sheets

FUEL CANISTER HEATING AND PURGING SYSTEM

TECHNICAL FIELD

The present discloser relates to fuel systems for vehicles.

BACKGROUND

Vehicles may include fuel systems that are configured to deliver fuel from a fuel tank to an internal combustion engine.

SUMMARY

A vehicle includes an engine, a fuel tank, a primary canister, a first valve, a second valve, a third valve, a heater, secondary canister, and a controller. The engine is configured to propel the vehicle. The fuel tank is configured to store fuel. The primary canister is in fluid communication with the fuel tank and is configured to receive and store evaporated fuel from the fuel tank. The first valve is disposed between the fuel tank and the primary canister. The second valve is disposed between the primary canister and ambient surroundings. The third valve is disposed between the primary canister and the engine. The heater is disposed within the primary canister. The secondary canister is in fluid communication with the primary canister. The secondary canister is configured to receive and store the evaporated fuel from the fuel tank. The secondary canister is disposed between the primary canister and the second valve. The controller is programmed to, in response to a command to purge the primary and secondary canisters, (i) close the first, second, and third valves and activate the heater to heat the primary canister; (ii) heat the secondary canister via opening the first valve, while the second and third valves remain closed and while the heater is activated, to force air from the fuel tank toward the primary canister and to force heated air from the primary canister toward the secondary canister; and (iii) after heating the secondary canister, open the second and third valves to purge the evaporated fuel from the primary and secondary canisters to the engine.

A vehicle includes an engine, a fuel tank, a primary canister, a fuel tank vent valve, a canister vent valve, a canister purge valve, a secondary canister, a heater, and a controller. The engine is configured to propel the vehicle. The fuel tank is configured to store fuel. The primary canister is in fluid communication with the fuel tank and is configured to receive and store evaporated fuel from the fuel tank. The fuel tank vent valve is disposed between the fuel tank and the primary canister. The canister vent valve is disposed between the primary canister and ambient surroundings. The canister purge valve is disposed between the primary canister and the engine. The secondary canister is in fluid communication with the primary canister. The secondary canister is configured to receive and store evaporated fuel from the fuel tank. The secondary canister is disposed within a common space with the primary canister. The heater is configured to heat the common space. The controller is programmed to, in response to a command to purge the primary and secondary canisters, (i) close the fuel tank vent valve, canister vent valve, and canister purge valve and activate the heater to heat the common space such that the primary and secondary canisters are heated; and (ii) after heating the common space for a predetermined period of time, open the canister vent valve and the canister purge valve to purge the evaporated fuel from the primary and secondary canisters to the engine.

A vehicle includes a fuel tank, a primary canister, a secondary canister, a first valve, a second valve, a third valve, a heater, and a controller. The fuel tank is configured to store fuel. The primary and secondary canisters are in fluid communication with the fuel tank and are configured to receive and store evaporated fuel from the fuel tank. The first valve is disposed between the fuel tank and the primary canister. The first valve is configured to facilitate transportation of the evaporated fuel from the fuel tank to the primary and secondary canisters when open. The second valve is disposed between the secondary canister and ambient surroundings. The second valve is configured to direct ambient air from the ambient surroundings into the primary and secondary canisters when open. The third valve is disposed between the primary canister and an engine. The third valve is configured to facilitate purging the evaporated fuel from the primary and secondary canisters to the engine when open. The heater is configured to heat the primary and secondary canisters. The controller is programmed to, in response to a command to purge the primary and secondary canisters, (i) close the first, second, and third valves and activate the heater to heat the primary and secondary canisters; and (ii) after heating the primary and secondary canisters, open the second and third valves to direct the ambient air into the primary and secondary canisters and purge the evaporated fuel from the primary and secondary canisters.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
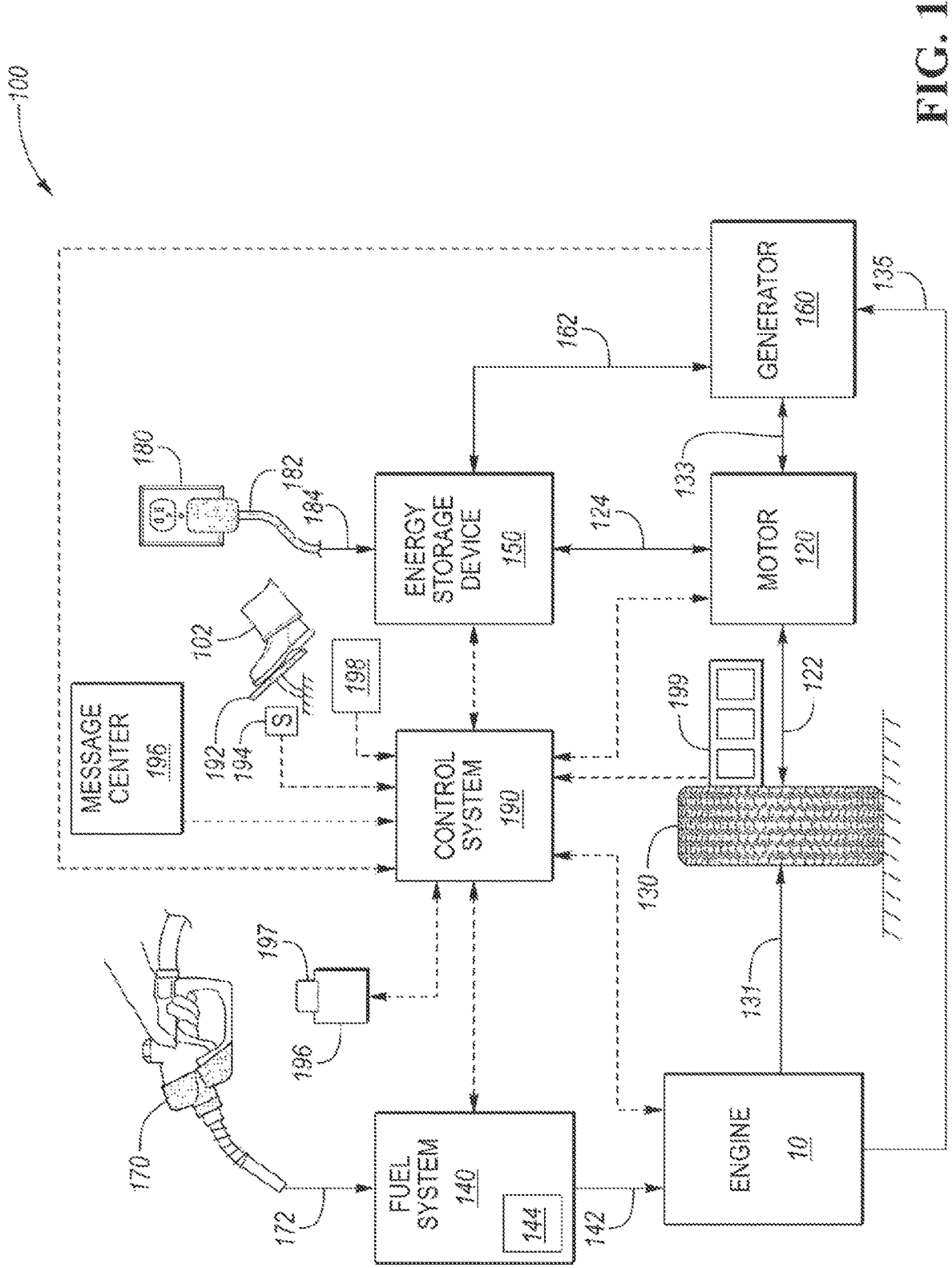
FIG. 1 is a schematic illustration of a vehicle propulsion system.

FIG. 1 illustrates an example vehicle and vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 10 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 10 is deactivated.

During other operating conditions, engine 10 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 10 may be operated by combusting fuel received from fuel system 140 as indicated by arrow 142. For example, engine 10 may be operated to propel the vehicle via drive wheel 130 as indicated by arrow 131 while motor 120 is deactivated. During other operating conditions, both engine 10 and motor 120 may each be operated to propel the vehicle via drive wheel 130 as indicated by arrows 131 and 122, respectively. A configuration where both the engine and the motor may selectively propel the vehicle may be referred to as a parallel type vehicle propulsion system. Note that in some examples, motor 120 may propel the vehicle via a first set of drive wheels and engine 10 may propel the vehicle via a second set of drive wheels.

In other examples, vehicle propulsion system 100 may be configured as a series type vehicle propulsion system, whereby the engine does not directly propel the drive wheels. Rather, engine 10 may be operated to power motor 120, which may in turn propel the vehicle via drive wheel 130 as indicated by arrow 122. For example, during select operating conditions, engine 10 may drive generator 160 as indicated by arrow 135, which may in turn supply electrical energy to one or more of motor 120 as indicated by arrow 133 or energy storage device 150 as indicated by arrow 162. As another example, engine 10 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 10 as indicated by arrow 142. Still other suitable fuels or fuel blends may be supplied to engine 10, where they may be combusted at the engine 10 to produce an engine output. The engine output may be utilized to propel the vehicle as indicated by arrow 131 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 10, motor 120, fuel system 140, energy storage device 150, and generator 160. Control system 190 may receive sensory feedback information from one or more of engine 10, motor 120, fuel system 140, energy storage device 150, and generator 160. Further, control system 190 may send control signals to one or more of engine 10, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 10.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 10 for combustion.

In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
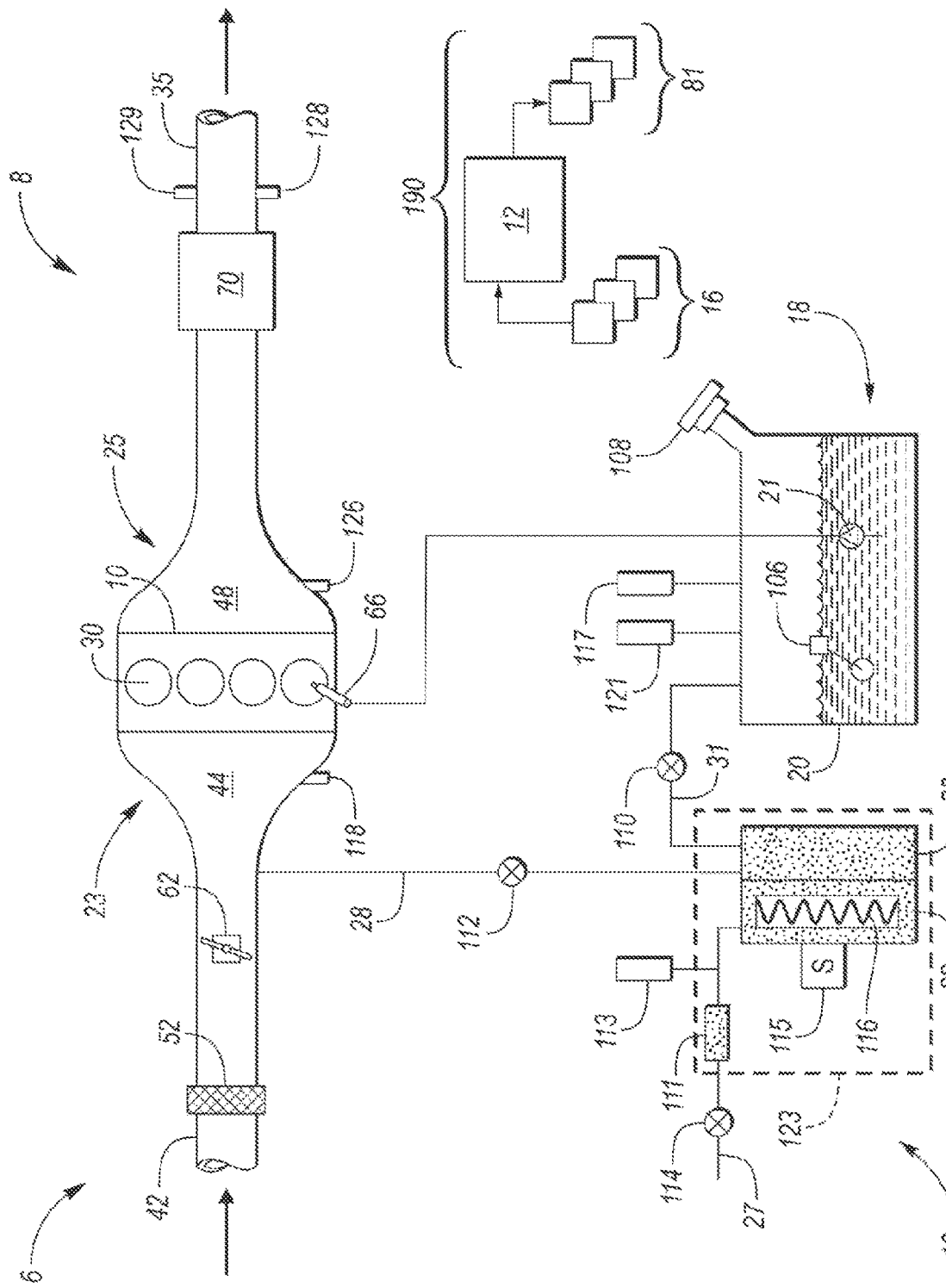
FIG. 2 is a schematic illustration of a vehicle and a fuel system for the vehicle.

FIG. 2 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22, which is in fluid communication with the fuel tank 20 and is configured to receive and store evaporated fuel from the fuel tank. Fuel vapor canister 22 may be referred to as the first or primary canister. During a fuel tank refueling event, fuel may be pumped into the vehicle from an external source through refueling port 108. Fuel tank 20 may store or hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to deliver pressurized fuel to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While two canisters are shown, it will be appreciated that fuel system 18 may include any number of canisters. In one example, canister purge valve 112 may be a solenoid valve wherein opening or closing of the valve is performed via actuation of a canister purge solenoid. The canister purge valve 112 is disposed between canister 22 and the engine 10. The canister purge valve 112 is configured to facilitate purging the evaporated fuel from the canisters (e.g., canister 22 and canister 111) to the engine 10 when open.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere (i.e., the ambient surrounding or ambient air) when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the ambient surrounding air or atmosphere. The canister vent valve 114 is disposed between canister 22 and the ambient surrounding air or atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

Evaporative emissions system 19 may further include a bleed canister 111. Hydrocarbons that desorb from canister 22 (hereinafter also referred to as the "main canister") may be adsorbed within the bleed canister 111. Bleed canister 111 may include an adsorbent material that is different than the adsorbent material included in main canister 22. Alternatively, the adsorbent material in bleed canister 111 may be the same as that included in main canister 22. The bleed canister 111 may be referred to as the second or secondary canister. Canister 22 and bleed canister 111 may be disposed within a common housing or space 123.

A hydrocarbon sensor 113 may be present in evaporative emissions system 19 to indicate the concentration of hydrocarbons in vent 27. As illustrated, hydrocarbon sensor 113 is positioned between main canister 22 and bleed canister 111. A probe (e.g., sensing element) of hydrocarbon sensor 113 is exposed to and senses the hydrocarbon concentration of fluid flow in vent 27. Hydrocarbon sensor 113 may be used by the engine control system 190 for determining breakthrough of hydrocarbon vapors from main canister 22, in one example.

One or more temperature sensors 115 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister. Further, one or more canister heaters or heating elements 116 may be coupled to and/or within canister 22. Canister heating element 116 may be used to selectively heat the canister 22 (and the adsorbent contained within) for example, to increase desorption of fuel vapors prior to performing a purge operation. Heating element 116 may comprise an electric heating element, such as a conductive metal, ceramic, or carbon element that may be heated electrically, such as a thermistor. In some embodiments, heating element 116 may comprise a source of microwave energy, or may comprise a canister jacket coupled to a source of hot air or hot water. Heating element 116 may be coupled to one or more heat exchangers that may facilitate the transfer of heat, (e.g., from hot exhaust) to canister 22. Heating element 116 may be configured to heat air within canister 22, and/or to directly heat the adsorbent located within canister 22. In some embodiments, heating element 116 may be included in a heater compartment coupled to the interior or exterior of canister 22. In some embodiments, canister 22 may be coupled to one or more cooling circuits, and/or cooling fans. In this way, canister 22 may be selectively cooled to increase adsorption of fuel vapors (e.g., prior to a refueling event). In some examples, heating element 116 may comprise one or more Peltier elements, which may be configured to selectively heat or cool canister 22. The heating element 116 may also be configured to heat the common space 123 such that the heating element also heats the bleed canister 111. Alliteratively, the heating element 116 may be disposed outside of the canister 22 and within the common space 123.

Hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that the fuel tank 20 is coupled to canister 22 via the valve 110. The fuel tank isolation valve 110 is disposed between the fuel tank 20 and canister 22. The fuel tank isolation valve 110 may also be referred to as the fuel tank vent valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

The canister 22 and bleed canister 111 may be sealed within the common space 123 when the fuel tank isolation valve 110, canister purge valve 112, and canister vent valve 114 are all closed. This supports facilitation of heating both the canister 22 and bleed canister 111 when the heating element 116 is activated by preventing the air that is being heated within the common space 123 from escaping the common space 123. The fuel tank isolation valve 110, canister purge valve 112, and canister vent valve 114 may be referred to as the first, second, and third valves in any manner.

One or more pressure sensors 117 may be coupled to fuel system 18 for providing an estimate of a fuel system (and evaporative emissions system) pressure. In one example, the fuel system pressure, and in some example evaporative emissions system pressure as well, is indicated by pressure sensor 117, where pressure sensor 117 is a fuel tank pressure transducer (FTPT) coupled to fuel tank 20. While the depicted example shows pressure sensor 117 directly coupled to fuel tank 20, in alternate embodiments, the pressure sensor may be coupled between the fuel tank and canister 22, specifically between the fuel tank 20 and isolation valve 110 along conduit 31. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be controlled by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold. Stated in other terms, the fuel tank isolation valve 110 is configured to facilitate transportation of the evaporated fuel from the fuel tank 20 to the canister 22 and bleed canister 111 when open. The bleed canister 111 is in fluid communication with canister 22, is configured to receive and store the evaporated fuel from the fuel tank 20, and is disposed between canister 22 and the second canister vent valve 114. The canister vent valve 114 is configured to direct ambient air from the ambient surroundings into canister 22 and bleed canister 111 when open.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 190. Control system 190 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 117, hydrocarbon sensor 113, temperature sensor 121, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 190 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 190 may further be configured to receive information via the internet or other communication networks. Information received from the GPS may be cross-referenced to information available via the internet to determine local weather conditions, local vehicle requirements, etc. Control system 190 may use the internet to obtain updated software modules which may be stored in non-transitory memory.

The control system 190 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIG. 3.

It should be understood that the vehicle configuration described herein with respect to FIGS. 1 and 2 is merely exemplary and is not intended to be limited. Other non-hybrid or hybrid vehicle configurations should be construed as disclosed herein. Other vehicle configurations may include, but are not limited to, vehicles powered only by an engine, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), or any other vehicle configuration known to a person of ordinary skill in the art.

The canisters (e.g., canister 22 and bleed canister 111) adsorb fuel vapors during refueling, diurnal cycles, and via running loss. The running manifold vacuum of the engine is used to desorb the vapors from the canister via opening the canister purge valve 112. The desorbed vapors (i.e., evaporated fuel) are then combusted in engine. This is commonly known as purging. The ability of the canisters to adsorb fuel vapors is enhanced at cooler temperatures. The ability of the canisters to desorb fuel vapors is enhanced at hotter temperatures. Bleed emissions observed during SHED testing may include hydrocarbons that are trapped inside and then escape the canisters. Heating the canisters may increase desorption. Purging the canisters while heated stimulates the desorption of vapor and increases the yield of vapors that is removed from the canisters and directed toward the engine 10.

SHED testing is typically a two-to-three-day diurnal test. The total vehicle hydrocarbon emissions must not exceed certain limits during SHED testing. In Practically zero emissions vehicles (PZEV), an additional canister (e.g., bleed canister 111) may be required to capture hydrocarbons that migrate from the main canister (e.g., canister 22) and would otherwise escape to the atmosphere. The additional canister is needed to capture bleed emissions (i.e., hydrocarbons that free themselves from the main canister) over the two-to-three-day diurnal cycle. Bleed canisters are required to classify a vehicle as PZEV.

Hydrocarbons may tend to move from areas of high concentration inside the canister 22 to areas of low concentration (e.g., toward the bleed canister 111). Gasoline is made up of many species of hydrocarbons (e.g., butane, pentane, octane, propane, etc.). On average, hydrocarbons are heavier than air by a ratio of about three to one. The molar mass of butane is 60 g/mol. The molar mass of propane is 44 g/mol. The molar mass of pentane is 72 g/mol. The molar mass of decane is 144 g/mol. Air has molar mass of 28 g/mol. Air is lighter than most hydrocarbons. A purge cycle may be initiated by activating the main canister heater (e.g., heating element 116) and purging the canisters via the engine vacuum while monitoring the universal exhaust gas oxygen sensors (e.g., exhaust gas sensor 126) for a rich air-to-fuel ratio response. During a typical purge, ambient air enters the bleed canister 111 and then the main-heated canister 22. The bleed canister 111 may not experience the effect of the heat from the main canister 22. A rich response indicates that vapors are being desorbed from main canister. At some point during purging, the main canister is cleaned out and this is indicated by the universal exhaust gas oxygen sensors switching lean. The method 200 described herein allows for heating of the bleed canister 111, without adding an additional heater, which results in an increase in desorption of vapors from the bleed canister 111 during a purge cycle.

Figure 3:
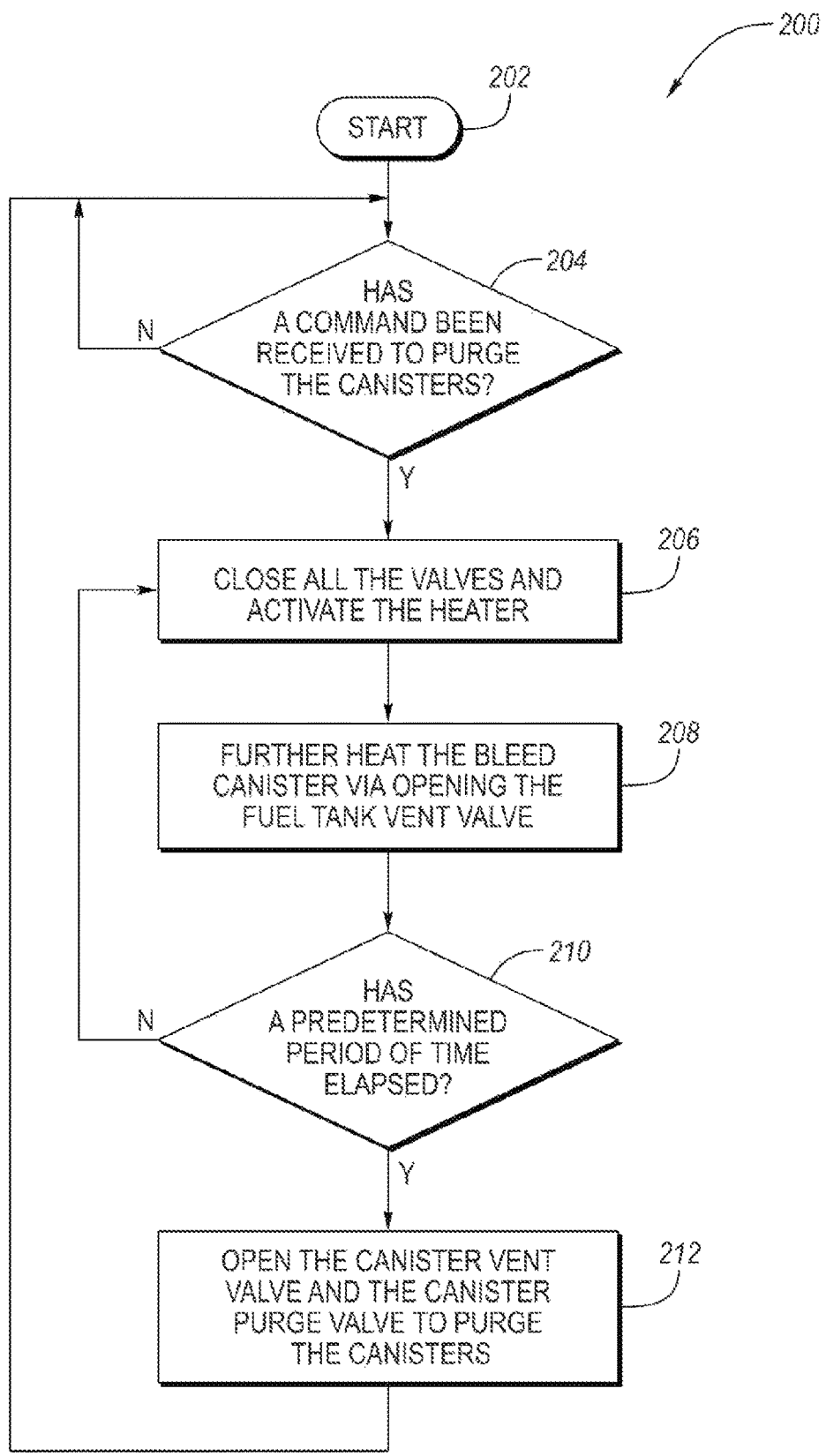
FIG. 3 is a flowchart illustrating a method for heating and purging canisters of a vehicle evaporative emissions system.

Referring to FIG. 3, a flowchart of a method 200 for heating and purging the canisters (e.g., canister 22 and bleed canister 111) of the evaporative emissions system 19 is illustrated. The method 200 may be stored as control logic and/or an algorithm within the controller 12 and may be implemented by the controller 12 via controlling the various components illustrated in FIGS. 1 and 2 in response to receiving various inputs from the components and sensors illustrated in FIGS. 1 and 2.

The method 200 is initiated at start block 202. Next, the method 200 moves on to block 204 where it is determined if a command has been received to purge the canisters (e.g., canister 22 and bleed canister 111). Such a command may be generated when one or more of the canisters are saturated, when the amount of fuel vapors adsorbed by one or more of the canisters is greater than a threshold value, or in response to a sensor (e.g., exhaust gas sensor 126, which may be a universal exhaust gas oxygen sensor) detecting that the engine 10 is operating under a rich air-to-fuel ratio that is greater than a threshold value. If it is determined that a command has not been received to purge the canisters, the method 200 recycles back to the beginning of block 204.

If it is determined at block 204 that a command has been received to purge the canisters, the method 200 moves on to block 206 where the fuel tank isolation valve 110, canister purge valve 112, and canister vent valve 114 are all closed such that the canister 22 and bleed canister 111 are sealed within the common space 123. Also, at block 206 the heating element 116 is activated to heat the canister 22. The heating element 116 may also heat the bleed canister 111 at block 206. The heating element 116 may heat the common space 123 such that the canister 22 and bleed canister 11 are heated within the common space 123.

The method 200 next moves on to block 208 where the bleed canister 111 is heated, or further heated if also being heated at block 206, by opening the fuel tank isolation valve 110, while the purge valve 112 remains closed, the canister vent valve 114 remains closed, and the heating element 116 remains activated. Opening the fuel tank isolation valve 110 while the purge valve 112 and canister vent valve 114 remain closed at block 208 forces air that has been pressurized in the fuel tank 20 to flow from the fuel tank toward the canister 22, which in turn forces the heated air within the canister 22 toward the bleed canister 111 to heat, or further heat, the bleed canister 111. While the fuel tank isolation valve 110 is closed prior to being opened at block 208, the pressure within within the fuel tank 20 increases due to heat being rejected into the air, fuel, and fuel vapors within the fuel tank 20. Such heat that is rejected to the air, fuel, and fuel vapors within the fuel tank 20 may include waste heat from the fuel pump 21, heat generated via the fuel sloshing within the fuel tank 20, heat from the external environment, etc.

More specifically, the fuel tank isolation valve 110 may be intermittently opened and closed while the purge valve 112 remains closed, the canister vent valve 114 remains closed, and the heating element 116 remains activated at block 208 in order to heat, or further heat, the bleed canister 111. Each time the fuel tank isolation valve 110 is opened, air that has been pressurized in the fuel tank 20 is forced to flow from the fuel tank toward the canister 22, which in turn forces the heated air within the canister 22 toward the bleed canister 111 to heat, or further heat, the bleed canister 111. The fuel tank isolation valve 110 may be opened at block 208 each time the pressure within the fuel tank 20 exceeds a threshold value.

Next, at block 210, the method 200 determines if a predetermined period of time has elapsed. Block 210 may operate simultaneously with blocks 206 and 208. If the predetermined period of time has not elapsed, the method 200 remains at blocks 206 and 208 where the canisters (e.g., canister 22 and bleed canister 111) are heated and the fuel tank isolation valve 110 may be intermittently opened, particularly each time the pressure within the fuel tank 20 exceeds the threshold value. If the predetermined period of time has elapsed, the method 200 moves on to block 212 where the canister vent valve 114 and the canister purge valve 112 are both opened such that ambient air is directed into the canisters (e.g., canister 22 and bleed canister 111) to purge the fuel vapors out of the canisters and direct the fuel vapors to the engine 10. The suction or vacuum from the engine 10 may function so that the fluids (e.g., air and fuel vapors) flow toward the engine 10. Also at block 212, the fuel tank isolation valve 110 may be closed during the purging process. Once the purging operation is complete, the method 200 may return to the beginning of block 204.

It is noted that the method 200 may skip block 208, and move on to block 212 via block 210, particularly during an event where the pressure within the fuel tank 20 never exceeds the threshold value over the predetermined period of time. It should be understood that the flowchart in FIG. 3 is for illustrative purposes only and that the method 200 should not be construed as limited to the flowchart in FIG. 3. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine configured to propel the vehicle;
   a fuel tank configured to store fuel;
   a primary canister (i) in fluid communication with the fuel tank and (ii) configured to receive and store evaporated fuel from the fuel tank;
   a first valve disposed between the fuel tank and the primary canister;
   a second valve disposed between the primary canister and ambient surroundings;
   a third valve disposed between the primary canister and the engine;
   a heater disposed within the primary canister;
   a secondary canister (i) in fluid communication with the primary canister, (ii) configured to receive and store the evaporated fuel from the fuel tank, and (iii) disposed between the primary canister and the second valve; and
   a controller programmed to, in response to a command to purge the primary and secondary canisters,
      close the first, second, and third valves and activate the heater to heat the primary canister,
      heat the secondary canister via opening the first valve, while the second and third valves remain closed and while the heater is activated, to (i) force air from the fuel tank toward the primary canister and (ii) force heated air from the primary canister toward the secondary canister, and
      after heating the secondary canister, open the second and third valves to purge the evaporated fuel from the primary and secondary canisters to the engine.

2. The vehicle of claim 1, wherein the controller is further programmed to heat secondary canister for a predetermined period of time prior to purging the evaporated fuel from the primary and secondary canisters to the engine.

3. The vehicle of claim 1, wherein the controller is further programmed to intermittently open the first valve, while the second and third valves remain closed and while the heater is activated, to (i) force air from the fuel tank toward the primary canister and (ii) force heated air from the primary canister toward the secondary canister to heat the secondary canister prior to purging the evaporated fuel from the primary and secondary canisters to the engine.

4. The vehicle of claim 3, wherein the controller is programmed to intermittently open the first valve in response to a pressure within the fuel tank exceeding a threshold.

5. The vehicle of claim 1, wherein the primary and secondary canisters are disposed within a common space such that the heater heats the primary and secondary canisters when activated.

6. The vehicle of claim 5, wherein the primary and secondary canisters are sealed within the common space in response to closing the first, second, and third valves.

7. A vehicle comprising:
   an engine configured to propel the vehicle;
   a fuel tank configured to store fuel;
   a primary canister in fluid communication with the fuel tank and configured to receive and store evaporated fuel from the fuel tank;
   a fuel tank vent valve disposed between the fuel tank and the primary canister;
   a canister vent valve disposed between the primary canister and ambient surroundings;
   a canister purge valve disposed between the primary canister and the engine;
   a secondary canister (i) in fluid communication with the primary canister, (ii) configured to receive and store evaporated fuel from the fuel tank, and (iii) disposed within a common space with the primary canister;
   a heater configured to heat the common space; and
   a controller programmed to, in response to a command to purge the primary and secondary canisters,
      close the fuel tank vent valve, canister vent valve, and canister purge valve and activate the heater to heat the common space such that the primary and secondary canisters are heated, and
      after heating the common space for a predetermined period of time, open the canister vent valve and the canister purge valve to purge the evaporated fuel from the primary and secondary canisters to the engine.

8. The vehicle of claim 7, wherein the heater is disposed within the primary canister.

9. The vehicle of claim 8, wherein the secondary canister is disposed between the primary canister and the canister vent valve.

10. The vehicle of claim 9, wherein the controller is further programmed to, during the predetermined period of time, open the fuel tank vent valve, while the canister vent valve and the canister purge valve each remain closed and while the heater is activated, to (i) force air from the fuel tank toward the primary canister and (ii) force heated air from the primary canister toward the secondary canister to further heat the secondary canister.

11. The vehicle of claim 9, wherein the controller is further programmed to intermittently open the fuel tank vent valve during the predetermined period of time, while the canister vent valve and the canister purge valve each remain closed and while the heater is activated, to (i) force air from the fuel tank toward the primary canister and (ii) force heated air from the primary canister toward the secondary canister to further heat the secondary canister.

12. The vehicle of claim 11, wherein the controller is programmed to intermittently open the fuel tank vent valve in response to a pressure within the fuel tank exceeding a threshold.

13. The vehicle of claim 8, wherein the primary and secondary canisters are sealed within the common space in response to closing the fuel tank vent valve, canister vent valve, and canister purge valve.

14. A vehicle comprising:
   a fuel tank configured to store fuel;
   primary and secondary canisters (i) in fluid communication with the fuel tank and (ii) configured to receive and store evaporated fuel from the fuel tank;
   a first valve (i) disposed between the fuel tank and the primary canister and (ii) configured to facilitate transportation of the evaporated fuel from the fuel tank to the primary and secondary canisters when open;
   a second valve (i) disposed between the secondary canister and ambient surroundings and (ii) configured to direct ambient air from the ambient surroundings into the primary and secondary canisters when open;
   a third valve (i) disposed between the primary canister and an engine and (ii) and configured to facilitate purging the evaporated fuel from the primary and secondary canisters to the engine when open;
   a heater configured to heat the primary and secondary canisters; and
   a controller programmed to, in response to a command to purge the primary and secondary canisters,
      close the first, second, and third valves and activate the heater to heat the primary and secondary canisters, and
      after heating the primary and secondary canisters, open the second and third valves to (i) direct the ambient air into the primary and secondary canisters and (ii) purge the evaporated fuel from the primary and secondary canisters.

15. The vehicle of claim 14, wherein the heater is disposed within the primary canister.

16. The vehicle of claim 15, wherein the secondary canister is disposed between the primary canister and the second valve.

17. The vehicle of claim 16, wherein the controller is further programmed to intermittently open the first valve, while the second and third valves remain closed and while the heater is activated, to (i) force air from the fuel tank toward the primary canister and (ii) force heated air from the primary canister toward the secondary canister to further heat the secondary canister prior to purging the evaporated fuel from the primary and secondary canisters to the engine.

18. The vehicle of claim 17, wherein the controller is programmed to intermittently open the first valve in response to a pressure within the fuel tank exceeding a threshold.

19. The vehicle of claim 16, wherein the primary and secondary canisters are heated for a predetermined period of time prior to purging the evaporated fuel from the primary and secondary canisters.

20. The vehicle of claim 14, wherein the primary and secondary canisters are sealed within a common space in response to closing the first, second, and third valves.

* * * * *